United States Patent [19]
Rossetti

[11] Patent Number: 4,975,060
[45] Date of Patent: Dec. 4, 1990

[54] PSYCHOLOGICAL TEST GAME

[76] Inventor: Massimo Rossetti, via della Consulta n.1, Rome, Italy

[21] Appl. No.: 378,992

[22] Filed: Jul. 12, 1989

[30] Foreign Application Priority Data

Mar. 18, 1988 [IT] Italy .................................. 3560/88[U]

[51] Int. Cl.⁵ .............................................. G09B 19/00
[52] U.S. Cl. .................................................... 434/236
[58] Field of Search ............... 434/236, 237, 171, 211, 434/213, 343, 345, 195, 200, 205; 273/272, 299, 153 P, 156, 161

[56] References Cited

U.S. PATENT DOCUMENTS

| | | | |
|---|---|---|---|
| 1,880,130 | 9/1932 | Goldbach | 273/156 |
| 3,224,114 | 12/1965 | Swanson | 273/272 X |
| 3,290,798 | 12/1966 | Gilbert | 273/272 X |
| 3,302,310 | 2/1967 | Leven | 273/156 X |
| 3,565,442 | 2/1971 | Klein | 273/157 R |
| 4,323,245 | 4/1982 | Beaman | 273/157 R |
| 4,361,328 | 11/1982 | Stein et al. | 273/156 |
| 4,419,081 | 12/1983 | Steinmann | 273/157 R |

FOREIGN PATENT DOCUMENTS 2487686 2/1982 France .................................. 273/272

*Primary Examiner*—Robert Bahr
*Assistant Examiner*—Jennifer L. Doyle

[57] ABSTRACT

A method and combination are provided for facilitating identification of human character types and compatibility among respective individuals. The combination includes object pieces associated with respective character types. The manner in which object pieces may be interfaced provides an indication of the relative levels of compatibility among associated character types.

14 Claims, 15 Drawing Sheets

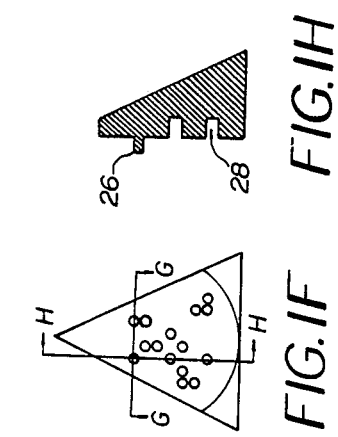
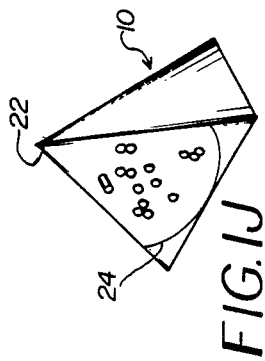
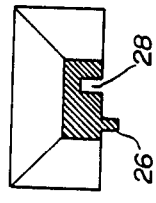
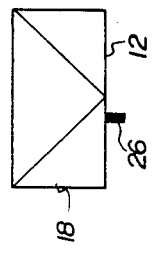
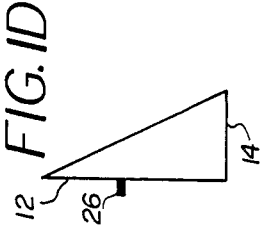
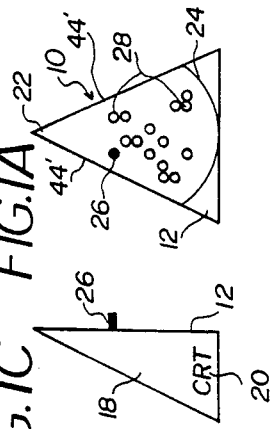
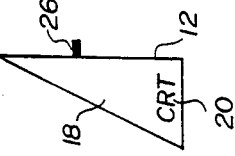
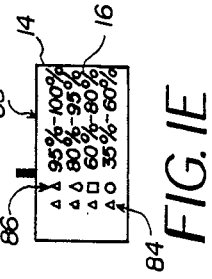

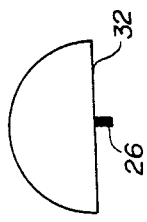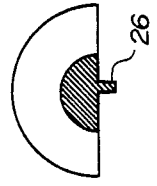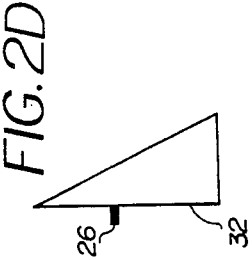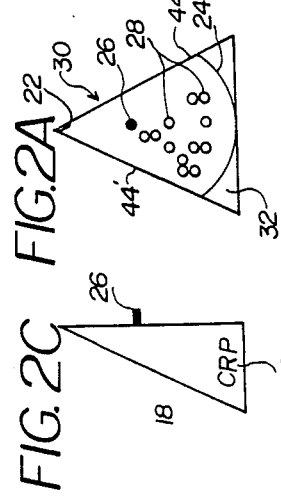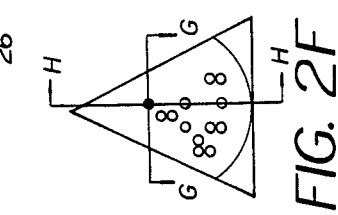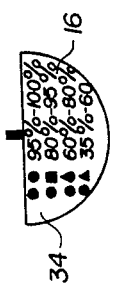

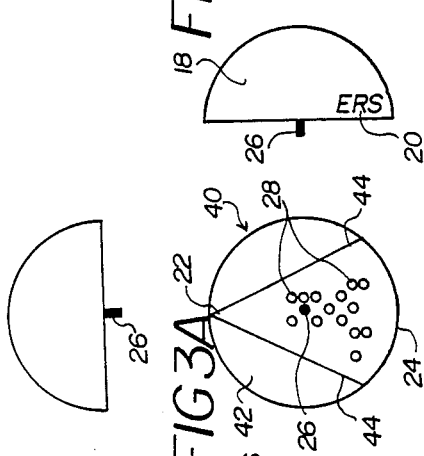
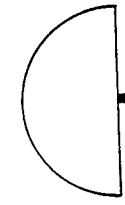
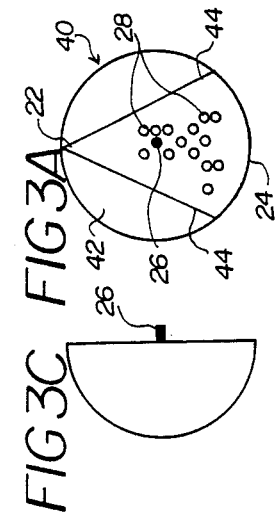
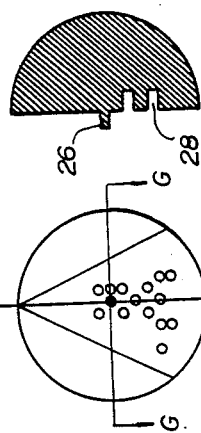
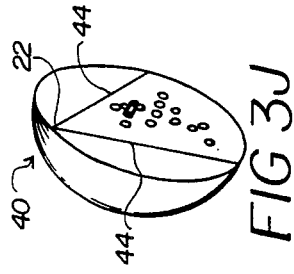
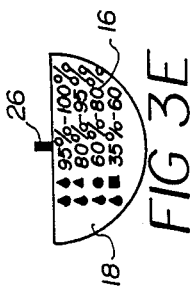

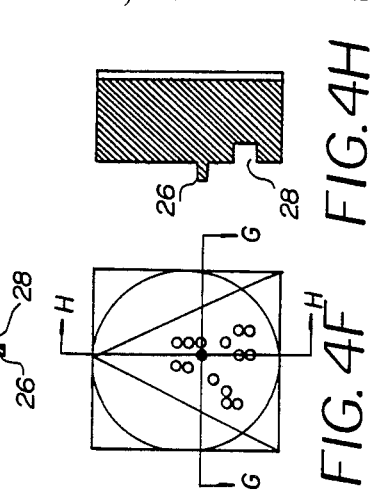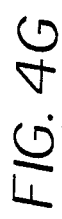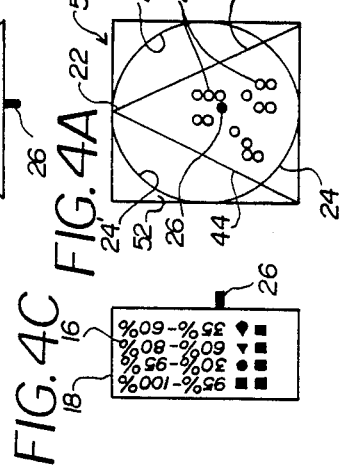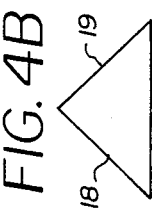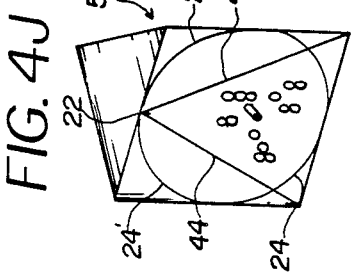

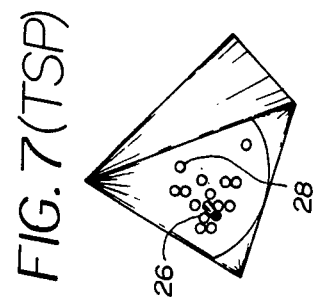
FIG.7(TSP)
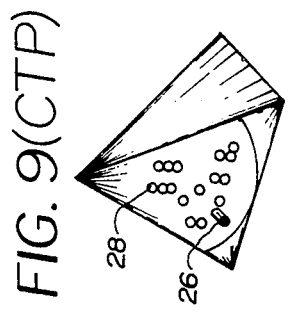
FIG.9(CTP)
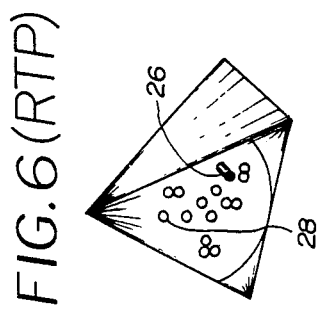
FIG.6(RTP)
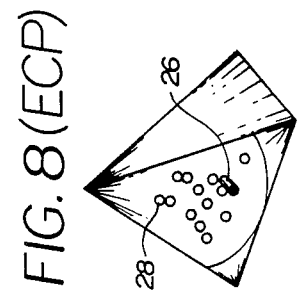
FIG.8(ECP)
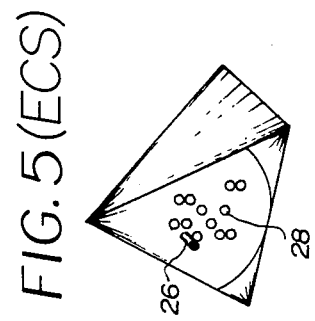
FIG.5(ECS)

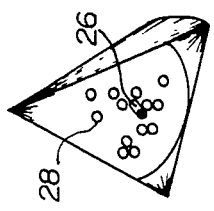
FIG. 12(ETP)
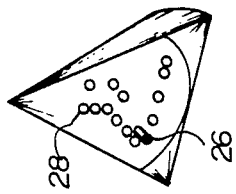
FIG. 14(CRS)
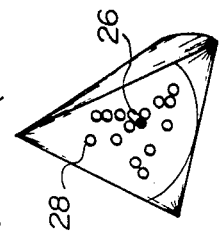
FIG. 11(ERP)
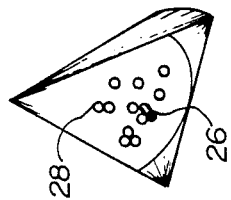
FIG. 13(ERT)
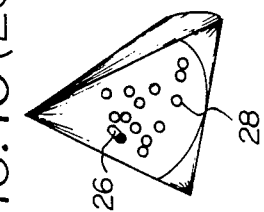
FIG. 10(ESP)

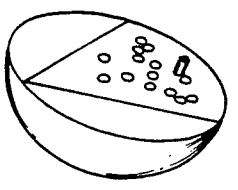
FIG. 17 (RSP)
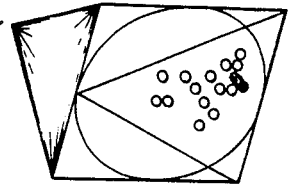
FIG. 20 (CTS)
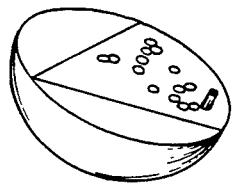
FIG. 16 (RTS)
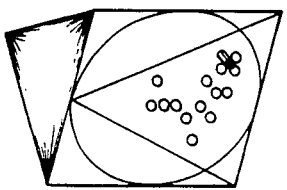
FIG. 19 (CSP)
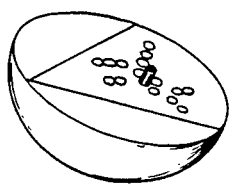
FIG. 15 (ECR)
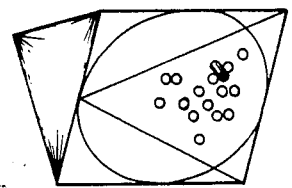
FIG. 18 (ECT)

FIG. 21

| | | 62 PSYCHOLOGICAL TEST | 64 | | | | | |
|---|---|---|---|---|---|---|---|---|
| | | | E 2 | C | R | T 2 | S | P |
| 1) | | Have you read at least one book within the last three months? | | | | | | |
| | a) | YES | | | | | | |
| | b) | NO | | | | | | |
| 2) | a) | | | 3 | | | | |
| | b) | | | | 3 | | | |
| | c) | | | | | | | 3 |
| | d) | | | | | 3 | | |
| | e) | | | 2 | | | | |
| | f) | | | | | | | |
| 3) | a) | | | | | | | |
| | b) | | | | | | | |
| 4) | a) | | | | | | 2 | |
| | b) | | | 3 | | | 2 | |
| | c) | | | 2 | | | | |
| | d) | | | | | | | |
| 5) | a) | | 1 | | | | 1 | |
| | b) | | 4 | | | | | |
| | c) | | | | | | 3 | |
| 6) | a) | | 1 | | | | 1 | |
| | b) | | 3 | | | | | |
| | c) | | 2 | | | | | |
| 7) | a) | | | | 4 | | | |
| | b) | | | | 2 | | 2 | |
| | c) | | 1 | | | | | |
| | d) | | | | | | 2 | |
| 8) | a) | | | 2 | | | | |
| | b) | | | | | 4 | | |
| | c) | | | | | 2 | | |
| 9) | a) | | | | | | | |
| | b) | | | | 3 | | | |
| | c) | | | | | 2 | 3 | |
| | d) | | | 3 | | 2 | | |
| 10) | a) | | | | | 3 | | |
| | b) | | | | | | | |
| 11) | a) | | | | | | | |
| | b) | | | | | | | |
| 12) | a) | | | | | | 2 | |
| | b) | | | | | | | |
| | c) | | 2 | | | | | |
| 13) | a) | | | | | | 3 | |
| | b) | | | | | | 3 | |
| | c) | | | | | | | |
| 14) | a) | | | | | 2 | | |
| | b) | | | | | 2 | | |
| | c) | | | | | | | |
| 15) | a) | | | 4 | | | | |
| | b) | | | | | | | |
| 16) | a) | | | | 5 | | | |
| | b) | | | | | | | |

FIG. 21 (CONTINUED)

| Item | | E | C | R | T | S | P |
|---|---|---|---|---|---|---|---|
| 17) | a) | 1 | | | | | |
| | b) | | 4 | | | | |
| | c) | 1 | 2 | | | | |
| 18) | a) | | 3 | | | | |
| | b) | | | 3 | | | |
| | c) | | | | | 2 | |
| | d) | | | 1 | | | 3 |
| 19) | a) | | | 2 | | | |
| | b) | | | | | | |
| | c) | | | | | 3 | 3 |
| 20) | a) | | | | | | |
| | b) | | | | | 2 | |
| 21) | a) | | | | | | |
| | b) | | | | | 2 | |
| 22) | a) | | | | | 3 | |
| | b) | | | | | | |
| 23) | a) | | | | 2 | | 2 |
| | b) | | | | | | |
| 24) | a) | | | | | | 3 |
| | b) | | | | | | 3 |
| | c) | | | | | | 3 |
| | d) | | | | 1 | | 4 |
| 25) | a) | | | | | | 3 |
| | b) | | | | | | |
| 26) | a) | | | | | | 3 |
| | b) | | | | | | |
| 27) | a) | | | | | | 4 |
| | b) | | | | | | |
| 28) | a) | | | 2 | | | |
| | b) | | | | | | |
| 29) | a) | | | 3 | | | |
| | b) | | | | | | |
| 30) | a) | | | 3 | | | |
| | b) | | | | | | |
| 31) | a) | | | 3 | | | |
| | b) | | | | | | |
| 32) | a) | | | 4 | | | |
| | b) | | | | | | |
| 33) | a) | | | 3 | | | |
| | b) | | | | | | |
| | | E | C | R | T | S | P |

| PSYCHOLOGICAL TEST | E | C | R | T | S | P |
|---|---|---|---|---|---|---|
| 1) Have you read at least one book within the last three months? | x2 | | | x2 | | |
|    a) YES | | | | | | |
|    b) NO | | | | | | |
| 2) a) | | | | | | |
|    b) | 3 | | | | | |
|    c) | | 3 | | | | |
|    d) | | | | | | 3 |
|    e) | | | 3 | | | |
|    f) | x2 | | | | | |
| 3) a) | | | | | | |
|    b) | | | | | | |
| 4) a) | | | | | | |
|    b) | | | | | 2 | |
|    c) | x3 | | | | x2 | |
|    d) | 2 | | | | | |
| 5) a) | | | | | | |
|    b) | x1 | | | | x1 | |
|    c) | 4 | | | | | |
| 6) a) | | | | | 3 | |
|    b) | x1 | | | | x1 | |
|    c) | 3 | | | | | |
| 7) a) | 2 | | | | | |
|    b) | | | 4 | | | |
|    c) | | | x2 | | x2 | |
|    d) | L | | | | | |
| 8) a) | | | | | 2 | |
|    b) | x2 | | | | | |
|    c) | | | | 4 | | |
| 9) a) | | | | 2 | | |
|    b) | | | | | | |
|    c) | | | 3 | | | |
|    d) | | | | x2 | x3 | |
| 10) a) | | 3 | | 2 | | |
|    b) | | | | | | |
| 11) a) | | | | x3 | | |
|    b) | | | | | | |
| 12) a) | | | | | 2 | |
|    b) | | | | | | |
|    c) | x2 | | | | | |
| 13) a) | | | | 3 | | |
|    b) | | | | | x3 | |
|    c) | | | | | | |
| 14) a) | | | | 2 | | |
|    b) | | | | 2 | | |
|    c) | | | | | | |
| 15) a) | | 4 | | | | |
|    b) | | | | | | |
| 16) a) | | 5 | | | | |
|    b) | | | | | | |

FIG. 22 (CONTINUED)

| | | E 14 | C 4 | R 8 | T 12 | S 15 | P 9 |
|---|---|---|---|---|---|---|---|
| 17) | a) | | 1 | | | | |
| | b) | | 4 | | | | |
| | c) | x1 | x2 | | | | |
| 18) | a) | | 3 | | | | |
| | b) | | | x3 | | | |
| | c) | | | | 2 | | |
| | d) | | | 1 | 2 | 3 | |
| 19) | a) | | | 2 | | | |
| | b) | | | | | | |
| | c) | | | | | x3 | x3 |
| 20) | a) | | | | | | |
| | b) | | | | | x2 | |
| 21) | a) | | | | | | |
| | b) | | | | | 2 | |
| 22) | a) | | | | | 3 | |
| | b) | | | | | | |
| 23) | a) | | | | x2 | | x2 |
| | b) | | | | | | |
| 24) | a) | | | | | | |
| | b) | | | | | | 3 |
| | c) | | | | | | 3 |
| | d) | | | | x1 | | x4 |
| 25) | a) | | | | | | 3 |
| | b) | | | | | | |
| 26) | a) | | | | | | 3 |
| | b) | | | | | | |
| 27) | a) | | | | | | 4 |
| | b) | | | | | | |
| 28) | a) | | | x2 | | | |
| | b) | | | | | | |
| 29) | a) | | | 3 | | | |
| | b) | | | | | | |
| 30) | a) | | | 3 | | | |
| | b) | | | | | | |
| 31) | a) | | | 3 | | | |
| | b) | | | | | | |
| 32) | a) | | | 4 | | | |
| | b) | | | | | | |
| 33) | a) | | | x3 | | | |
| | b) | | | | | | |

| | |
|---|---|
| 1 CRT | 1 CRT-3 ESP-4 ERS-6 ETS-7 ERP-8 ECR-9 RTP-11 ETP-12 ECT-13 CSP-16 CRS-17 RTS-18 CTS |
| 2 CRP | 4 ERS-6 ETS-7 ERP-8 ECR-9 RTP-12 ECT-13 CSP-14 FCP-16 CRS-18 CTS-19 RSP-20 CTP |
| 3 ESP | 1 CRT-4 ERS-5 ECS-6 ETS-7 ERP-8 ECR-9 RTP-10 TSP-12 ECT-14 ECP-17 RTS-19 RSP-20 CTP |
| 4 ERS | 1 CRT-2 CRP-3 ESP-4 ERS-5 ECS-6 ETS-8 ECR-10 TSP-11 EPT-13 CSP-14 ECP-15 ERT-16 CRS-18 CTS-20 CTP |
| 5 ECS | 3 ESP-4 ERS-5 ECS-6 ETS-7 ERP-8 ETP-11 ETP-14 ECP-15 ERT-16 CSR-18 CTS-20 CTP |
| 6 ETS | 1 CRT-2 CRP-3 ESP-4 ERS-5 ECS-7 ERP-9 RTP-10 TSP-12 ECT-13 CSP-15 ERT-16 CRS-19 RSP-20 CTP |
| 7 ERP | 1 CRT-2 CRP-3 ESP-5 ECS-6 ETS-8 ECR-10 TSP-12 ECT-13 CSP-14 ECP-16 CRS-17 RTS-19 RSP-20 CTP |
| 8 ECR | 1 CRT-2 CRP-3 ESP-4 ERS-6 ETS-8 ERP-8 ECR-9 RPT-10 TSP-11 ETP-12 ECT-14 ECP-16 CRS-17 RTS-18 CTS |
| 9 RTP | 1 CRT-2 CRP-3 ESP-6 ETS-8 ECR-9 RTP-10 TSP-11 ETP-12 ECT-13 CSP-15 ERT-17 RTS-19 RSP-20 CTP |
| 10 TSP | 3 ESP-4 ERS-6 ETS-7 ERP-8 ECR-9 RTP-10 TSP-12 ECT-13 CSP-14 ECP-15 ERT-17 RTS-18 CTS-19 RSP |
| 11 ETP | 1 CRT-4 ERS-5 ECS-8 ECR-9 RTP-10 TSP-11 ETP-12 ECT-13 CSP-14 ECP-15 ERT-18 CTS-19 RSP-20 CTP |
| 12 ECT | 1 CRT-2 CRP-3 ESP-6 ETS-7 ERP-8 ECR-9 RTP-10 TSP-11 ETP-14 ECP-15 ERT-16 CRS-17 RTS-18 CTS-19 RSP |
| 13 CSP | 1 CRT-2 CRP-4 ERS-6 ETS-7 ERP-8 ECR-12 ECT-13 CSP-14 ECP-15 ERT-16 CRS-17 RTS-19 RSP-20 CTP |
| 14 ECP | 2 CRP-3 ESP-4 ERS-5 ECS-7 ERP-8 ECR-10 TSP-11 ETP-12 ECT-13 CSP-15 ERT-17 RTS-18 CTS |
| 15 ERT | 4 ERS-5 ECS-6 ETS-9 RTP-10 TSP-11 ETP-12 ECT-13 CSP-14 ECP-18 CTS-19 RSP-20 CTP |
| 16 CRS | 1 CRT-2 CRP-4 ERS-5 ECS-6 ETS-7 ERP-8 ECR-12 ECT-13 CSP-17 RTS-18 CTS-19 RSP-20 CTP |
| 17 RTS | 1 CRT-3 ESP-7 ERP-8 ECR-9 RTP-10 TSP-12 ECT-13 CSP-14 ECP-16 CRS-17 RTS-18 CTS-19 RSP-20 CTP |
| 18 CTS | 1 CRT-2 CRP-4 ERS-5 ECS-8 ECR-10 TSP-11 ETP-12 ECT-14 ECP-15 ERT-16 CRS-17 RTS-18 CTS |
| 19 RSP | 2 CRP-3 ESP-6 ETS-7 ERP-9 RTD-10 TSP-11 ETP-12 ECT-13 CSP-15 ERT-16 CRS-17 RTS-18 CTS-20 CTP |
| 20 CTP | 2 CRP-3 ESP-4 ERS-5 ECS-6 ETS-7 ERP-9 RTP-11 ETP-13 CSP-15 ERT-16 CRS-17 RTS-18 CTS-19 RSP-20 CTP |

PSYCHOLOGICAL TEST GAME

FIELD OF THE INVENTION

The invention relates to a psychological testing method and a combination of elements for use with such method which may be used as a game or as a medium of social introduction.

BACKGROUND OF THE INVENTION

Studies in the field of psychology have indicated the possibility of grouping all human personalities under a relatively limited number of character types. This grouping is done on the basis of six moral and intellectual temperaments which are prevalent in the human mind. These temperaments are esthetic, economic, religious, theoretical, social and political. Based upon which three of these six temperaments predominate in an individual's personality, that personality may be categorized as one of twenty character types.

Various approaches may be taken to determining the character type of one or more individuals and to making use of such determinations. It would be desirable to be able to easily identify the character type of one or more individuals and to make proper use of that information without extensive knowledge or training in psychology or testing methodology. This would enable persons without specialized skills or knowledge to benefit from information concerning their own character traits and/or such traits of others with whom they might associate.

OBJECTS OF THE INVENTION

Accordingly, it is an object of the present invention to enable individuals without specialized skill or training to obtain information about individual character types and to make good use of such information.

It is a particular object of the invention to provide a combination of elements and a method for determining the character type of one or more individuals. It is a further object to provide means and a method for determining the degree of compatibility among respective individuals.

The present invention provides means and a method which can be used as a game or exercise among individuals to determine the extent to which they are compatible with each other. The present invention also provides a combination of elements and a method which can be used as a socializing medium among people making and seeking new acquaintances, providing an indication of the extent to which two individuals may be compatible.

SUMMARY OF THE INVENTION

The invention comprises a combination which includes a plurality of object pieces associated with respectively different character types according to first criteria. Means are provided for identifying an object piece associated with the character type of a human subject. Each object piece comprises interfacing means for interfacing with other object pieces. The interfacing means of each object piece is provided with coding means for determining which of the remaining object pieces of the combination may interface therewith based upon second criteria concerning compatibility of respective character types.

In a preferred embodiment, each object piece comprises a three dimensional object having a geometric shape, the interfacing means of each object comprising a surface thereof. The coding means for each object piece may comprise a projection extending from the interfacing surface and one or more recesses in the interfacing surface for receiving the projection of another object piece. A minimal level of compatibility of two character types is indicated by an ability of the object pieces associated with those character types to interface with each other. The degree of compatibility is indicated by the combination of geometric shapes formed by the respective object pieces.

The invention also comprises a method for ascertaining compatibility of character among human subjects. The method comprises obtaining responses from a plurality of human subjects to a plurality of questions and identifying a character type for each subject based upon the responses. According to the inventive method, an object piece is assigned to each subject, the object piece being associated with the character type of the subject, each object piece comprising interfacing means for interfacing with other object pieces and coding means for permitting each object piece to interface only with other object pieces associated with compatible character types. The method of the invention includes the step of interfacing object pieces assigned to respective subjects to ascertain compatibility between the subjects.

DESCRIPTION OF THE DRAWINGS

FIG. 1A is a front elevation view of an object piece having a first configuration according to the present invention.

FIG. 1B is a top view of the object piece of FIG. 1A.

FIGS. 1C and 1D are side views of the object piece of FIG. 1A.

FIG. 1E is a bottom view of the object piece of FIG. 1A.

FIG. 1F is a front elevation view, similar to FIG. 1A, of the object piece of FIG. 1A.

FIG. 1G is a sectional view along line GG of FIG. 1F.

FIG. 1H is a sectional view along line HH of FIG. 1F.

FIG. 1J is a perspective view of the object piece of FIG. 1A.

FIGS. 2A-2J are views, similar to FIGS. 1A-1J, respectively, of an object piece according to the present invention having a second configuration.

FIGS. 3A-3J are views, similar to FIGS. 1A-1J, respectively, of an object piece according to the invention having a third configuration.

FIGS. 4A-4J are views, similar to FIGS. 1A-1J, respectively, of an object piece according to the invention having a fourth configuration FIGS. 5-9 are perspective views of additional object pieces according to the invention having a configuration like the object piece shown in FIGS. 1A-1J.

FIGS. 10-14 are perspective views of additional object pieces according to the invention having a configuration like the object piece shown in FIGS. 2A-2J.

FIGS. 15-17 are perspective views of additional object pieces according to the invention having a configuration like that which is shown in FIGS. 3A-3J.

FIGS. 18-20 are perspective views of other object pieces according to the invention having a configuration like that which is shown in FIGS. 4A-4J.

FIG. 21 illustrates a question sheet according to the present invention.

FIG. 22 illustrates the question sheet of FIG. 21 after being completed in a simulated test procedure.

FIG. 23 is a chart which provides information concerning minimal compatibility among various character types.

DESCRIPTION OF A PREFERRED EMBODIMENT

Figure 24:
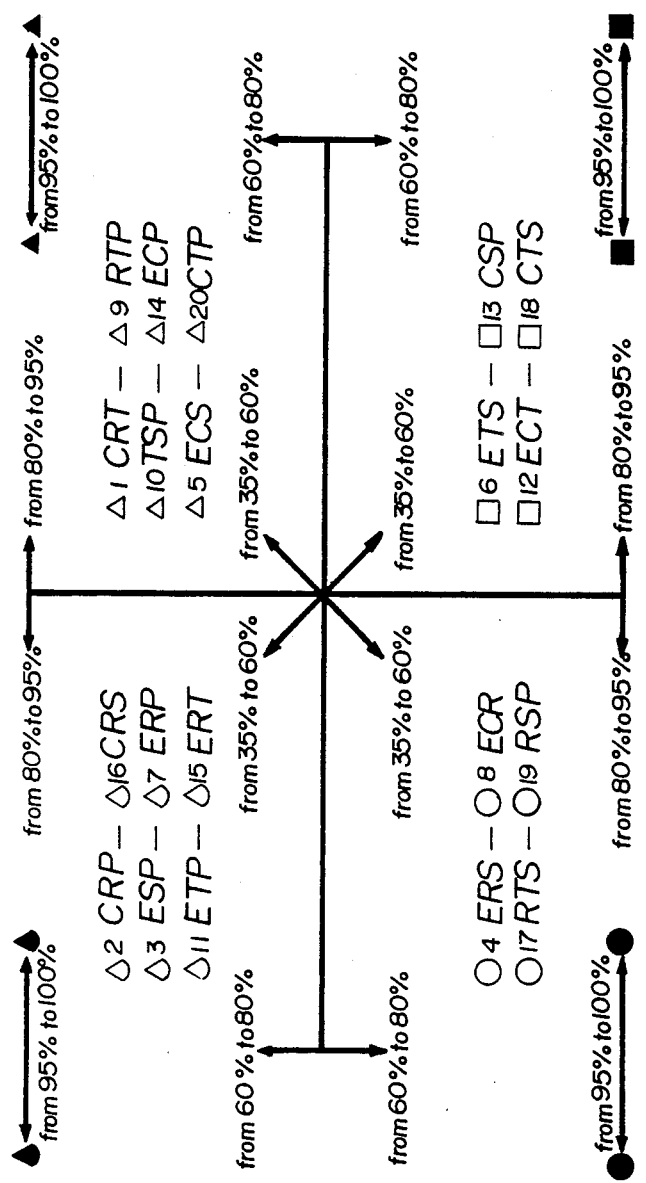
FIG. 24 is a chart which summarizes the degree of compatibility among various groups of character types.

The present invention includes both a method and means for performing the method. Generally, a combination of elements according to a preferred embodiment of the invention includes a set of questions, the responses to which provide an indication of the character type of an individual. Further included are object pieces corresponding to the various character types.

In a preferred embodiment described herein, a combination comprises a question sheet including thirty-three (33) questions and twenty (20) object pieces. The object pieces are of four different geometric forms. Four object pieces are in the form of hemispheres obtained by bisecting a sphere. The bisected face, therefore, has the form of a circle. Four object pieces are in the form of hemiparallelepipeds obtained by bisecting a square-based parallelepiped. The bisected face, thus, has the form of a square. Six object pieces are in the form of hemipyramids obtained by vertically bisecting a square-based pyramid. The bisected face, therefore, is an equilateral triangle. Six of the object pieces are in the form of hemicones obtained by vertically bisecting a cone. The bisected face, therefore, has the shape of an equilateral triangle.

The bisected face of each object piece comprises interfacing means. Each interfacing means comprises coding means for determining which object pieces may be interfaced with each other, as will be described in greater detail hereinafter.

Each participant provides responses to the above-discussed questions. Based upon the responses, the participant obtains an object piece associated with his or her character type. Participants then attempt to interface their object pieces with the object pieces of other participants. Compatibility between participants is indicated by whether respective participants are able to interface their object pieces and the respective shapes of their object pieces.

A first form of object piece is illustrated in FIG. 1A, designated generally by reference numeral 10. Object piece 10 is a hemipyramid (half pyramid) having a "front" surface 12 which is triangular in shape. Surface 12 comprises an interfacing surface for object piece 10. The designation "front" for surface 12 and similar designations for other portions in this specification is for the sake of convenient discussion only and is not a limitation with respect to the invention or with respect to the object pieces thereof.

Piece 10 includes a "bottom" surface 14 which is rectangular in shape. Surface 14 has imprinted or otherwise affixed thereon a reference table or chart 16 which provides information concerning the degree of compatibility among various character groups, as will be discussed in greater detail hereinafter. Another surface 18 of object piece 10 includes a label 20 which identifies the character type associated with the object piece.

Interfacing surface 12 includes an orientation mark 22 adjacent the apex of the triangular surface. An orientation arc 24 is also imprinted upon or otherwise affixed to surface 12. Mark 22 and arc 24 serve as orientation marks for interfacing respective object pieces, as will be discussed in greater detail below. Within the area between mark 22 and arc 24, surface 12 comprises coding means. The coding means comprises a projection 26 and a plurality of holes 28 of a size for receiving a projection 26 from another object piece. In the disclosed embodiment, each object piece comprises a sole projection 26 and a number of holes 28 determined by the number of other object pieces with which the particular object piece is to interface.

The object piece 10, as well as other object pieces to be described hereinafter, may be made of wood, plastic, glass or other suitable material. Object piece 10 may have a base width, as seen in FIG. 1A, of about 3 centimeters, thus forming a bottom surface 14 approximately 3 centimeters by 1.5 centimeters in dimension. The height, as seen in FIG. 1A may also be approximately 3 centimeters. Projection 26 may be about 3 millimeters in length and about 1.8 millimeters in diameter. Holes 28, sized to receive a projection 26, may be about 3.2 millimeters in depth and about 2 millimeters in diameter. These dimensions are only exemplary, and are not limiting with respect to object pieces or with respect to the present invention.

FIGS. 2A–2J illustrate another form of object piece according to the present invention, designated generally by reference numeral 30. This object piece is in the form of a hemicone (half cone) and comprises a front face 32 having a triangular shape. A bottom surface 34 is in the shape of a semicircle.

Object piece 30, like object piece 10, includes a reference table 16 on the bottom surface thereof, a surface 18 with a label 20 designating the character type with which the object piece is associated, orientation marks 22, 24, projection 26 and holes 28. Marks 22 and 24 are spatially arranged on surface 32 in the same manner as on surface 12 of object piece 10. As in object piece 10, coding means 26, 28 is similarly positioned between orientation mark 22 and arc 24.

FIGS. 3A–3J illustrate a further form of object piece according to the present invention. This object piece, generally designated by reference numeral 40, is in the form of a hemisphere. It includes a front face 42 which is circular in shape. Object piece 40 includes a hemispherical surface 18. Reference table 16 is imprinted on or otherwise affixed to surface 18, as is label 20.

Interface surface 42 includes orientation mark 22, corresponding to mark 22 on object pieces 10 and 30 (FIGS. 1A, 2A). Arc 24 of object pieces 10 and 30 correspond to the "lower" peripheral edge of circular face 42, as shown in FIG. 3A. Circular face 32 further includes orientation lines 44 which correspond to edges 44' (FIGS. 1A, 2A) on object pieces 10 and 30 when piece 40 is interfaced with piece 10 or piece 30, as will be discussed in greater detail hereinafter.

Coding means 26, 28 on face 42 is positioned between orientation mark 22 and the peripheral edge of face 42 corresponding to arc 24. Thus, the spatial arrangement of the coding means is like that described with reference to object piece 10 and object piece 30.

A fourth configuration of an object piece, generally designated by reference numeral 50, is illustrated in FIGS. 4A-4J. This object piece is in the form of a hemiparallelepiped (half parallelepiped). It includes a front face 52 which has a square shape.

Object piece 50, like to the previously-described object pieces, includes a reference table 16 on surface 18 and a label 20 on another surface 19.

Interfacing surface 52 has an orientation mark 22 corresponding to the similarly-designated marks discussed above with reference to object pieces 10, 30 and 40. Likewise, surface 52 comprises an orientation arc 24. Arc 24 is extended, as shown at 24' in FIG. 4A, to form a complete circle which corresponds to the periphery of face 42 of object piece 40 when object pieces 50 and 40 are interfaced. Surface 52 further comprises lines 44 which correspond to edges 44' (FIGS. 1A, 2A) of object pieces 10 or 30 when either of those object pieces is interfaced with object piece 50. Coding means 26, 28 of object piece 50 is positioned on surface 52 between mark 22 and arc 40, as described above with respect to object pieces 10, 30 and 40.

While it is not important that the object pieces according to the present invention be of any particular size, it is important that the sizes of the respective pieces be compatible with each other. This is important so that the interfacing surfaces of the respective object pieces will be of compatible dimensions, regardless of the particular shapes of the respective object pieces. For example, assuming object piece 10 (FIG. 1A) to have a base width of 3 centimeters and a height of 3 centimeters, object piece 30 should have a similar base width and height, object piece 40 should have a diameter of 3 centimeters, as viewed in FIG. 3A and object piece 50 should comprise a square interfacing surface 42 (FIG. 4A) which is 3 centimeters in each direction. If consistent dimensions are maintained in this manner, when respective object pieces are interfaced with each other by juxtaposing their interfacing surfaces, orientation marks 22 may be aligned with each other, arcs 24 may be aligned with each other and/or lines 44 and edges 44' may be aligned, which will result in the orientation means 26, 28 of the respective object pieces also being in alignment, regardless of the respective shapes of the object pieces.

It is noted that the dimension set forth in the preceding paragraph is exemplary only. The object pieces may be larger or smaller, provided that compatibility of dimensions, as discussed above, is maintained.

FIGS. 1A-1J, discussed above, are detailed views of an object piece having the shape of a hemipyramid and labeled CRT, corresponding to a character type having that designation. FIGS. 5-9 are perspective views, similar to FIG. 1J, of other object pieces according to the invention, also in the shape of a hemipyramid. These object pieces are labeled ECS, RTP, TSP, ECP and CTP, respectively, corresponding to other character types. The structure of each is similar to that discussed above with reference to FIGS. 1A-1J with the exception that the specific arrangement of projection 26 and holes 28 of the coding means varies from piece to piece as will be discussed in greater detail hereinafter.

FIGS. 10-14 are perspective views, like FIG. 2J, of other object pieces according to the invention in the shape of a hemicone. These are associated with character types ESP, ERP, ETP, ERT and CRS. Their structure is like the piece designated CRP in FIGS. 2A-2J, but each includes a different arrangement of coding means 26, 28. The object pieces in the form of a hemisphere illustrated in FIGS. 15-17 bear a similar relationship to the object piece illustrated and discussed above with respect to FIGS. 3A-3J. Likewise, the object pieces having the shape of a hemiparallelepiped illustrated in FIGS. 18-20 are similar to that which is disclosed with reference to FIGS. 4A-4J. Similarly, each of the object pieces of FIGS. 15-20 has a different arrangement of coding means 26, 28.

The manner in which the above-discussed object pieces are employed according to the present invention will become apparent upon consideration of another part of a combination according to the present invention, a series of questions provided for the purpose of identifying an individual's character type. FIG. 21 illustrates an arrangement of a question form according to the present invention, designated generally by reference numeral 60. Form 60 includes a set of questions designated by reference numeral 62 juxtaposed to a series of six columns. Each column is identified by a letter which corresponds to a significant aspect of human temperament. These are E (esthetic); C (economic); R (religious); T (theoretical); S (social); and P (political). At various positions in the respective columns, on lines corresponding to various responses to questions, there are positioned numbers indicative of numerical values assigned to certain responses, as is shown in FIG. 21. Appendix A to this specification sets forth thirty-three questions and responses which are appropriate to the positions designated 1-33, respectively, in portion 62 of the question form of FIG. 21 and which correspond with the numerical values assigned to responses as set forth in portion 64 of FIG. 21.

As an initial step in performing the method of the present invention, an individual participant responds to each of the thirty-three questions on form 60. As each response is made, the participant marks the numerical value or values which appear in any of the columns E, C, R, T, S or P on the same line as the chosen response. This is shown in FIG. 22 where, in a simulated set of responses, an "X" is placed alongside each appropriate numerical value. After all responses have been properly marked, the marked numerical values are totaled in each column, as shown generally at reference numeral 66 in FIG. 22.

To identify his or her character type, the participant must determine which three columns of the six columns includes the highest totals. Always reading from left to right, the three letters corresponding to the three columns having the highest totals identify the character type of the participant based upon the responses. In the hypothetical set of responses illustrated in FIG. 22, the character type indicated for the individual is ETS based upon those three columns having the highest total numerical values.

The questions and responses set forth in Appendix A and the numerical values in certain columns on form 60 associated with various responses are based upon prior studies in psychology. Using these questions and numerical values assigned as indicated, the above-described procedure will result in identification of character types among the twenty designated types. Information discussed below concerning compatibility of character types is also based upon prior studies in psychology.

Character types vary in compatibility. Some character types are highly compatible with each other while some are not compatible at all, with varying degrees of compatibility therebetween. The method and combination according to the present invention enables participants to identify others having character types having at least a minimal level of compatibility with their own character type. The invention further enables participants to identify the approximate degree of compatibility between their own character type and that of other participants.

Assuming that 0% means no compatibility and that 100% designates complete compatibility between character types, the presently disclosed embodiment identifies, by successful interfacing of object pieces, character types having a compatibility level of at least 35%. Additionally, as discussed in greater detail below, the invention is capable of indicating the approximate degree of compatibility between character types in ranges of 35-60%, 60-80%, 80-95%, and 95-100%.

FIG. 23 is a chart which includes information relating to compatibility between respective character types. In the left vertical column, designated by numbers 1-20, are the 3-letter codes designating the above-discussed twenty human character types. Each horizontal line of the chart of FIG. 23 sets forth the various other character types which are compatible at a level of 35% or greater with the character type designated in the left column.

For example, the exemplary set of responses set forth in FIG. 22 resulted in a character type designation ETS. This designation appears at line 6 in FIG. 23. In line 6, next to the designation ETS in FIG. 23, there are set forth the other character types which are compatible with type ETS at a level of 35% compatibility or greater. These include CRT, CRP, ESP, ERS, ECS, ERP, RTP, TSP, ECT, CSP, ERT, CRS, RSP and CTP. The character types which are not set forth in line 6 are those which are not considered to be compatible with type ETS inasmuch as compatibility with type ETS is less than 35%.

While FIG. 23 designates those character type pairs which have compatibility of 35% or more, the chart of FIG. 23 does not provide information with respect to the degree of compatibility of character pairs within the range 35-100%. For this information, reference is made to FIG. 24. Reference is to be made to FIG. 24 to determine the degree of compatibility only if FIG. 23 indicates compatibility between character types of at least 35%.

The chart of FIG. 24 is divided into four quadrants. Each quadrant is dedicated to a particular group of character types associated with object pieces of similar geometric shape. The upper left quadrant sets forth those character types which are associated with object pieces having the shape of a hemicone; the upper right quadrant relates to those character types associated with object pieces in the shape of a hemipyramid; the lower left quadrant relates to those character types associated with object pieces in the shape of a hemisphere; and the lower right quadrant relates to those character types associated with object pieces in the shape of a hemiparallelepiped.

Within each group of character types associated with object pieces of common shape, those character types which are indicated to be compatible with each other (in FIG. 23) are compatible at a level of 95-100%, as designated graphically in FIG. 24. Character types appearing in quadrants above and below each other, respectively, in FIG. 24, indicated to be compatible with each other (in FIG. 23) are compatible at a level of 60-80%. Character types appearing in quadrants to the left and right of each other, respectively, in FIG. 24, designated to be compatible (in FIG. 23) are compatible at a level of 80-95%. Character types appearing in quadrants diagonally opposite each other in FIG. 24, designated as compatible (in FIG. 23) are compatible with each other at a level of 35-60%. All of these levels of compatibility are illustrated graphically in FIG. 24.

In practice, during use of a combination according to the invention, it is not expected that participants will refer to charts such as FIGS. 23 and 24. Rather, after responding to the series of questions as discussed above with reference to FIGS. 21-22, and identifying their respective character types, each participant will obtain an object piece associated with that character type, as identified by labels 20 on the respective object pieces. Participants will determine if they are compatible with each other to a level of 35% or greater by attempting to interface their respective object pieces. If the object pieces interface successfully, as determined by the coding means on each piece, this indicates compatibility of 35% or greater. The participants may then refer to the reference table 16 imprinted or otherwise affixed to each object piece. Reference table 16 on each object piece provides the information concerning the degree of compatibility which would otherwise be obtained from a chart such as shown in FIG. 24. Thus, if two participants successfully interface their object pieces, they may refer to reference tables 16 thereon to determine their approximate level of compatibility in the manner discussed above. Each table 16 on an object piece comprises a first column including graphic representations of the object piece shape on which the table appears, as shown at 84 in FIG. 1E; a second column 86 which shows each shape of an object piece with which that object piece might interface; and numerical information, at 88, setting forth the degree of compatibility indicated by various combinations of object piece shapes. Thus, the shapes of the object pieces provide a visual indication of the degree of compatibility among character types.

As noted above, coding means comprising projections 26 and holes 28 determine if respective object pieces can be successfully interfaced with each other. Coding means according to the invention will be discussed in detail with reference to FIGS. 25, 25A and 25B.

Figures 25, 25A, 25B:
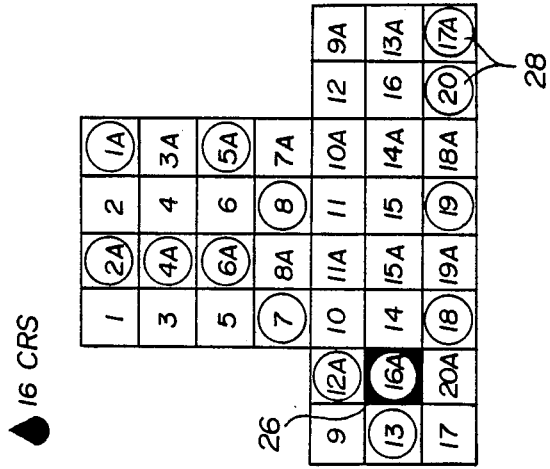
FIG. 25 illustrates a grid which is used for creating coding means associated with object pieces of the present invention.
FIGS. 25A and 25B are schematic illustrations of the coding means associated with exemplary object pieces according to the present invention.

On the interface surface of each object piece there is provided coding means comprising, in the preferred embodiment, a sole projection 26 and a plurality of holes 28. These are positioned at selected locations within the area bounded by orientation mark 22, arc 24 and lines 44 (or edges 44'). The locations at which projection 26 and/or holes 28 may be positioned are determined by an imaginary grid, as illustrated in FIG. 25. The grid is positioned in the same manner on each object piece so that the projection and holes, when provided at locations within the grid, will be positioned on the respective object pieces in a consistent manner.

As illustrated in FIG. 25, the grid comprises 40 locations designated 1-20 and 1A-20A. Positions 1-20 are located symmetrically opposite positions 1A-20A, respectively about center line CL in FIG. 25. Provision of two sequentially-designated sets of locations permits an arrangement of coding means which facilitates interfacing of two object pieces associated with the same character type, as will become evident from the discussion hereinbelow.

To avoid a uniform alignment of holes 28, which would render the object pieces aesthetically less appealing, the character type designations are divided into two groups. These are set forth in table 1 in two columns which will be designated the left group and the right group, respectively.

TABLE 1

| | |
|---|---|
| 2-CRP | 16-CRS |
| 3-ESP | 7-ERP |
| 11-ETP | 15-ERT |
| 4-ERS | 8-ECR |
| 17-RTS | 19-RSP |
| 1-CRT | 9-RTP |
| 10-TSP | 14-ECP |
| 5-ECS | 20-CTP |
| 6-ETS | 13-CSP |
| 12-ECT | 18-CTS |

The left group comprises those character types which appear on the left of each type pair appearing in FIG. 24. The right group comprises those character types which appear on the right of each type pair in FIG. 24. For example, CRP appears on the left of the first character type pair appearing in FIG. 24 and CRS appears on the right. Therefore, CRP and CRS appear in the left and right groups, respectively in Table 1. The following rules are followed when arranging the projection and holes of the coding means on the interface surface of each object piece.

On each object piece associated with a character type of the left group, projection 26 is located within the grid (FIG. 25) on the location having the number only which corresponds to the number of the character type. For example, CRP is character type number 2. As shown schematically in FIG. 25A, projection 26, designated by the darkened location on the grid, is located at position number 2. For those character types of the right group, projection 26 is positioned on the location within the grid having the corresponding number and the letter A. For example, character type CRS is number 16. Therefore, projection 26 is position at location 16A of the grid, as shown schematically in FIG. 25B.

To position holes 28 on an object piece associated with a selected character type, one first consults the chart of FIG. 23 to determine which other character types are compatible with the selected character type at a level of at least 35%. On the object piece associated with the selected character type, a hole 28 is provided in an appropriate grid location for each compatible character type. When a selected object piece from within the left group is compatible with another object piece from within the left group, the hole corresponding to the compatible character type is positioned on the correspondingly numbered position having a letter. For example, with respect to CRP, that object piece is compatible with 4-ERS. ERS is in the left group, therefore, a hole 28 is provided on piece CRP at location 4A of the grid. When an object piece from within the left group is compatible with an object piece from within the right group, a hole is placed on the grid location correspondingly numbered with the compatible character type, without the letter. For example, with reference to FIG. 25A, CRP is compatible with 7-ERP, a member of the right group. Therefore, a hole is placed at position 7 on the grid of piece CRP.

When a selected object piece associated with the right group is compatible with another object piece from within the right group, the holes are positioned on the selected piece over the locations in the grid having numbers alone corresponding to the compatible type. For example, with reference to FIG. 25B, character type CRS of the right group is compatible with 8-ECR, also from within the right group. Therefore, a hole 28 is provided at position 8 of the grid on piece CRS. Conversely, when a selected object piece from within the right group is compatible with an object piece from within the left group, the holes are positioned over the locations on the selected object piece having the corresponding number with the letter. Thus, CRS is compatible with 12-ECT of the left group. Therefore, a hole is positioned at location 12A of the grid on piece CRS.

In practice, interfacing is attempted by aligning orientation marks 22, arcs 24 and/or lines 44 or edges 44, on respective object pieces. If aligned properly, the respective object pieces will interface successfully and their interfacing surfaces will fit flush against each other if the respective object pieces represent character types having compatibility of at least 35%. This is because, when the coding means is prepared in the manner discussed above, projection 26 on an object piece will be aligned with and received within a hole 28 associated with each object piece associated with other character types having a compatibility level of at least 35%. If compatibility is less than 35%, no hole is provided and interfacing will not be successful.

Figure 26B:
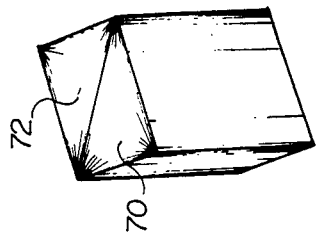
FIGS. 26A and 26B illustrate the manner in which object pieces having similar shapes may be interfaced with each other.
Figure 26A:
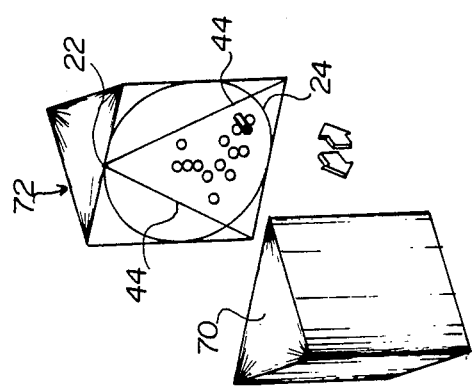

FIGS. 26A-26B and 27A-27B illustrate the manner in which respective object pieces may be successfully interfaced, whereby the interfacing surfaces are flush with each other. Specifically, FIG. 26A illustrates the manner in which two hemiparallelepipeds may be aligned for attempted interfacing. If the two object pieces 70 and 72 are associated with compatible character types when properly aligned they will successfully interface as illustrated in FIG. 26B, forming a complete parallelepiped. Reference Table 16 on surface 18 (FIG. 4C) will indicate to the participants that this successful interfacing between object pieces of similar shape represents compatibility at a level of 95-100%. Successfully interfacing two similar object pieces of the other shapes will, similarly, form a complete cone, pyramid or sphere.

Figure 27B:
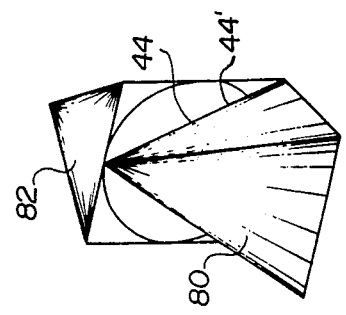
FIGS. 27A and 27B illustrate how object pieces having dissimilar shapes may be interfaced with each other.
Figure 27A:
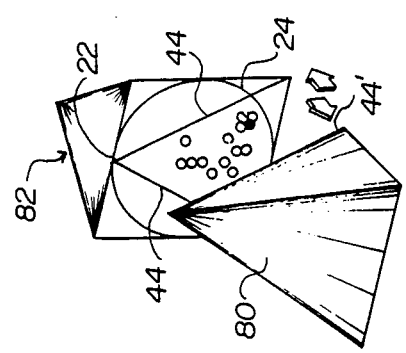

Similarly, FIG. 27A illustrates the manner in which object pieces of different geometric shapes might be interfaced. In this instance, a first object piece in the shape of a hemi-pyramid, designated by reference numeral 80, is aligned with an object piece in the shape of a hemiparallelepiped, designated by reference number 82. When brought into interfacing relationship, edges 44' on object piece 80 are aligned with lines 44 on piece 82 and orientation marks 22 are aligned. As shown in FIG. 27B, pieces 80 and 82 successfully interface, thus designating compatibility of at least 35%. Reference Table 16 on surface 18 of object piece 82 indicates that compatibility between these two character types is 60-80%, based upon the combination of successfully interfaced pieces of hemipyramid and hemiparallelepiped form. Reference Table 16 on surface 14 of object piece 80 provides the same information.

The method and combination of the present invention may be used by individuals for determining their respective character types. Each will obtain an object piece appropriate to his or her character type. They will then ascertain their respective degrees of compatibility with each other. The invention may be used as a medium of social introduction. For example, individuals desiring to make new acquaintances might follow the above procedures for identifying their respective character types and obtaining an appropriate object piece. Upon introduction, they might compare their object pieces, attempting to interface them in the manner discussed above. This will provide an indication if their character types are compatible and the degree to which they are compatible. This provides a basis upon which individuals may become better acquainted.

The invention, having been described above with reference to a preferred embodiment, is not limited to the details discussed above and described with reference to the accompanying drawings The invention is limited only by the claims appended hereto.

APPENDIX A

1. Have you read at least one book within the last three months?
   a. YES
   b. NO
2. You are given a book as a gift:
   a. You are disappointed.
      You are pleased: in this case you prefer:
   b. a book of poetry
   c. the autobiography of Lee Iacocca
   d. the autobiography of J. F. Kennedy
   e. a bound Bible
   f. an adventure book
3. Have you visited a museum or an exhibition within the last six months?
   a. YES
   b. NO
4. At a dance:
   a. I refuse to go
   b. I enjoy myself but refuse to dance
   c. I dance a lot
   d. I dance and enjoy myself
5. On an occasion when you have little time to eat at home:
   a. there's nothing in the refrigerator; you eat at a fast food place
   b. You eat the left-overs from dinner that you made for friends the night before
   c. You always have some canned food in the refrigerator for moments like this
6. Some friends are waiting for you to go out and you must still dress:
   a. you wear whatever's at hand so as not to keep them waiting
   b. you look for a suitable outfit trying to keep them waiting as little as possible
   c. your main concern is to wear something suitable for the occasion
7. When choosing a car you pay particular attention to:
   a. the color
   b. the price
   c. the quality/price ratio
   d. performance
8. You prefer to spend a vacation:
   a. anywhere as long as there is a lively night-life
   b. in solitude, in contact with nature
   c. in the city, reading books
9. You must make an important decision:
   a. you ponder by yourself, weighing the pros and cons
   b. you act impulsively
   c. you go to a palmist
   d. you consult with friends and family
10. Do you keep track of income and expenses?
    a. YES
    b. NO
11. Do you play chess?
    a. YES
    b. NO
12. Having a choice of jobs, you prefer:
    a. manual labor
    b. intellectual work
    c. something artistic
13. Do you ever express yourself in public in an inappropriate manner?
    a. no, I never lose control
    b. yes, but I try to recover myself immediately
    c. yes, often
14. Do you organize your day?
    a. yes, I keep to a schedule
    b. I carefully note everything down in my datebook
    c. no, I take things as they come
15. Do you have money to invest?
    a. YES
    b. NO
16. Do you read the financial page of the newspaper?
    a. YES
    b. NO
17. You are taking a vacation:
    a. you are not concerned with expenses even while incurring debts
    b. you plan expenses, adapting the type of vacation to a cost you can afford
    c. you choose a place that you like; only afterwards you attempt to conform the cost to your budget
18. From a job you require:
    a. high pay
    b. spiritual accomplishment
    c. pleasant working conditions
    d. that it be socially redeeming
19. You have the possibility of spending a year on a tropical desert island, complete with every comfort; you prefer:
    a. to remain by yourself
    b. to be with a partner
    c. to be with a harmonious group
20. Do you prefer individual sports (i.e., jogging or swimming) or team sports (i.e., football or basketball)?
    a. individual
    b. team
21. You have the option of performing the same work alone or in a group; which do you choose?
    a. to do it alone
    b. to do it in a group
22. Is it true that "two heads are better than one"?
    a. YES
    b. NO
23. Do you buy a newspaper every day?
    a. YES
    b. NO
24. You have just finished reading the newspaper; you have certainly not read:
    a. the local political page
    b. the sports section
    c. the entertainment page d. I read everything
25. Do you watch the news on T.V.?
   a. YES
   b. NO
26. Do you vote in the elections?
   a. YES
   b. NO
27. Have you ever been a candidate in any election?
   a. YES
   b. NO
28. Do you believe in the existence of a God?
   a. YES
   b. NO
29. Do you participate in the life of a religious community (i.e., going to a church)?
   a. YES
   b. NO
30. Have you ever carefully read any religious material?
   a. YES
   b. NO
31. Do you ever confide in a clergyman in order to keep your conscience clear?
   a. YES
   b. NO
32. Do you believe in destiny?
   a. YES
   b. NO
33. Are you at least slightly superstitious?
   a. YES
   b. NO

What is claimed is:

1. A combination comprising:
   a plurality of object pieces associated with a respective plurality of different character types;
   each object piece comprising interfacing means for interfacing with other object pieces;
   code means associated with the interfacing means of each object piece for determining which of said plurality of other object pieces may interface therewith; and
   a series of predetermined questions the responses to which are indicative of character type for identifying an object piece associated with the character type of one or more human subjects, whereby human subjects may obtain an indication of degree of compatibility of their respective character types by interfacing object pieces associated with their character types.

2. A combination as in claim 1, wherein each object piece is a three dimensional object of a geometric shape, said interfacing means of each object piece comprising an interfacing surface thereof.

3. A combination as in claim 2, wherein said code means for each object piece comprises a projection extending from said interfacing surface and one or more recesses in said interfacing surface, said recesses being of a size to receive a projection from the interfacing surface of other object pieces.

4. A combination as in claim 3, wherein the location of said projection on the interfacing surface of each object piece is determined by the character type associated with said object piece, and the location of said one or more recesses on the interfacing surface of each object piece is determined by the other character types compatible with said associated character type.

5. A combination as in claim 2, comprising a plurality of groups of object pieces, the object pieces within each group having the same geometric shape and the object pieces in different groups having different geometric shapes.

6. A combination as in claim 4, comprising a plurality of groups of object pieces, the object pieces within each group having the same geometric shape and the object pieces in different groups having different geometric shapes;
   wherein compatibility of two character types associated with two object pieces is indicated by the projections of said two object pieces being insertable into recesses of the respective other object pieces when the interfacing surfaces thereof are aligned with each other; and
   wherein the degree of compatibility of said two character types is indicated by the combination of geometric shapes of said two object pieces.

7. A combination as in claim 6 comprising groups of object pieces in the shapes of hemispheres, hemicones, hemipyramids and hemiparallelepipeds, wherein object pieces within the same group may be interfaced to form a whole sphere, cone, pyramid and parallelepiped, respectively.

8. The combination as in claim 1, wherein said predetermined questions and said responses are recorded in a format which indicates character type.

9. A combination comprising:
   a series of predetermined questions, the responses to which are indicative of character type among a plurality of character types;
   a plurality of object pieces, wherein each object piece is associated with one of the plurality of character types;
   each object piece comprising interfacing means for joining the object piece with others of said plurality of object pieces;
   said interfacing means of each object piece comprising coding means for determining which other object pieces may be joined therewith for providing an indication of compatibility of character types.

10. The combination of claim 9, wherein said object pieces comprise three dimensional objects of geometric shapes, the interfacing means of each object piece comprising an interfacing surface thereof.

11. The combination of claim 10, wherein the coding means for each object piece comprises a projection projecting from the interfacing surface thereof and one or more recesses in the interfacing surface thereof positioned to receive the projection of other object pieces representing compatible character types.

12. The combination of claim 10, comprising object pieces of different geometric shapes, wherein the degree of compatibility of character types associated with respective object pieces is indicated by the combination of geometric shapes represented by said respective object pieces.

13. The combination of claim 9, wherein said predetermined questions and said responses are recorded in a format which indicates character type.

14. A combination comprising:
   a plurality of three-dimensional object pieces associated with a respective plurality of different character types;
   each object piece comprising an interfacing surface for interfacing with other object pieces;
   code means associated with said interfacing surface of each object piece for determining which other object pieces may interface therewith, said code means comprising a projection extending from said interfacing surface and one or more recesses in said interfacing surface, said recesses being of a size to receive a projection from the interfacing surfaces of other object pieces, wherein the location of said projection is determined by the character type associated with said object piece and the location of said one or more recesses is determined by the other character types compatible with said associated character type;

said combination comprising groups of object pieces in the shapes of hemispheres, hemicones, hemipyramids and hemiparallelepipeds, and object pieces within the same group may be interfaced to form a whole sphere, cone, pyramid and parallelepiped, respectively; and the degree of compatibility of two character types is indicated by the combination of geometric shapes of two interfaced object pieces.

* * * * *